(12) United States Patent
Wang (10) Patent No.: US 7,577,538 B2
(45) Date of Patent: *Aug. 18, 2009

(54) COMPUTATIONAL METHOD AND SYSTEM FOR MASS SPECTRAL ANALYSIS

(75) Inventor: Yongdong Wang, Wilton, CT (US)

(73) Assignee: Cerno Bioscience LLC, Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/554,768

(22) PCT Filed: Apr. 28, 2004

(86) PCT No.: PCT/US2004/013096

§ 371 (c)(1),
(2), (4) Date: Oct. 28, 2005

(87) PCT Pub. No.: WO2004/097581

PCT Pub. Date: Nov. 11, 2004

(65) Prior Publication Data

US 2006/0217911 A1    Sep. 28, 2006

Related U.S. Application Data

(60) Provisional application No. 60/466,010, filed on Apr. 28, 2003.

(51) Int. Cl.
*G06F 19/00* (2006.01)
(52) U.S. Cl. .................. 702/85; 250/281; 250/282; 435/6; 702/30; 702/109

(58) Field of Classification Search .................. 702/19, 702/22–23, 27, 85, 104, 109, 180, 189; 435/4, 435/6, 7.1, 7.92, 69.1, 287.2; 436/58, 173, 436/518; 250/288, 282, 281; 324/304, 309
See application file for complete search history.

(56) References Cited

U.S. PATENT DOCUMENTS

| | | | | |
|---|---|---|---|---|
| 5,121,338 | A | * 6/1992 | Lodder | ......................... 702/30 |
| 5,303,165 | A | 4/1994 | Ganz et al. | |
| 5,545,895 | A | * 8/1996 | Wright et al. | ............... 250/282 |
| 6,138,082 | A | * 10/2000 | Wang et al. | ................. 702/109 |
| 6,188,064 | B1 | 2/2001 | Koster | |

(Continued)

OTHER PUBLICATIONS

Felinger, Data Analysis and Signal Processing, Cromatography, Elsevier (1998) Introduction; Sec. 10.21.1; Sec 10.2.2; Chapter 14 XP002439117.

(Continued)

*Primary Examiner*—John H Le
(74) *Attorney, Agent, or Firm*—David Aker (57) ABSTRACT

A method for analyzing data from a mass spectrometer including obtaining calibrated mass spectral data involving at least one ion with its isotopes, by processing raw spectral data; obtaining library spectral data which has been processed to form calibrated library data; and performing a regression analysis, preferably using matrix operations, between the calibrated mass spectral data and the calibrated library data; and reporting at least one regression coefficient representative of a relative concentrations of a component in a sample which generated the raw spectral data. The invention is also directed to a mass spectrometer system that operates in accordance with the method, a data library of transformed mass spectra, and a method for producing the data library.

52 Claims, 2 Drawing Sheets

U.S. PATENT DOCUMENTS

| | | | |
|---|---|---|---|
| 6,489,608 B1* | 12/2002 | Skilling | 250/281 |
| 6,656,690 B2* | 12/2003 | Crooke et al. | 435/6 |
| 2003/0109990 A1 | 6/2003 | Axelsson | |
| 2006/0169883 A1* | 8/2006 | Wang et al. | 250/282 |

OTHER PUBLICATIONS

Stein S E, An Integrated Method for Spectrum Extraction and Compound Indentification from Gas Chromatography/Mass Spectrometry Data, J.Am.Soc.Mass Spectrom, 10, p. 770-781(1999).

Guilhaus M, Principles and Instrumentation in Time-of-Flight Mass Spectrometry, Journal of Mass Spectrometry, vol. 30, p. 1519-1532 (1995).

Haaland D M et al., New Prediction-Augmented Classical Least-Squares (PACLS) Methods: Application to Unmodeled Interferents, Applied Spectroscopy, vol. 54, No. 9, p. 1303-12(2000).

Haaland D M et al., Application of New Least-squares Methods for the Quantitative Infrared Analysis of Multicomponent Samples, Applied Spectroscopy, vol. 36, No. 6, p. 665-73(1982).

Bauman K et al., Appropriate calibration functions for capilliary electrophresis II. Heteroscedasticity and its consequences, J. Chromatogr. A, vol. 700, No. 1, p. 9-20 (1995).

Milman B L et al., Identification of chemical substances in analytical measurements, Accred. Qual. Assur., vol. 4, No. 5, p. 185-190 (1999), Probability of Identification; Append. 1.

Bialkowski S E, Expectation-maximization algorithm for regression, deconvolution and smoothing of shot-noise limited data, Journal of Chemometrics, vol. 5, p. 211-225 (1991).

Kebarle P, A brief overview of the present status of the mechanisms involved in electrospray mass spectrometry, J. Mass Spectrom., vol. 35, No. 7. p. 804-817 (2000).

* cited by examiner

COMPUTATIONAL METHOD AND SYSTEM FOR MASS SPECTRAL ANALYSIS

This application claims priority from U.S. provisional application Ser. No. 60/466,010 filed on Apr. 28, 2003, the entire contents of which are hereby incorporated by reference. This application also claims priority from U.S. application Ser. No. 10/689,313 filed on Oct. 20, 2003, the entire contents of which are also incorporated by reference herein.

BACKGROUND OF THE INVENTION

1. Field of the Invention

The present invention relates to mass spectrometry systems. More particularly, it relates to mass spectrometry systems that are useful for the analysis of complex mixtures of molecules, including large organic molecules such as proteins, environmental pollutants, and petrochemical compounds, to methods of analysis used therein, and to a computer program product having computer code embodied therein for causing a computer, or a computer and a mass spectrometer in combination, to affect such analysis.

2. Prior Art

The race to map the human genome in the past several years has created a new scientific field and industry named genomics, which studies DNA sequences to search for genes and gene mutations that are responsible for genetic diseases through their expressions in messenger RNAs (mRNA) and the subsequent coding of peptides which give rise to proteins. It has been well established in the field that, while the genes are at the root of many diseases including many forms of cancers, the proteins to which these genes translate are the ones that carry out the real biological functions. The identification and quantification of these proteins and their interactions thus serve as the key to the understanding of disease states and the development of new therapeutics. It is therefore not surprising to see the rapid shift in both the commercial investment and academic research from genes (genomics) to proteins (proteomics), after the successful completion of the human genome project and the identification of some 35,000 human genes in the summer of 2000. Different from genomics, which has a more definable end for each species, proteomics is much more open-ended as any change in gene expression level, environmental factors, and protein-protein interactions can contribute to protein variations. In addition, the genetic makeup of an individual is relatively stable whereas the protein expressions can be much more dynamic depending on various disease states and many other factors. In this "post genomics era," the challenges are to analyze the complex proteins (i.e., the proteome) expressed by an organism in tissues, cells, or other biological samples to aid in the understanding of the complex cellular pathways, networks, and "modules" under various physiological conditions. The quantitation of the proteins expressed in both normal and diseased states plays a critical role in the discovery of biomarkers or target proteins.

The challenges presented by the fast-developing field of proteomics have brought an impressive array of highly sophisticated scientific instrumentation to bear, from sample preparation, sample separation, imaging, isotope labeling, to mass spectral detection. Large data arrays of higher and higher dimensions are being routinely generated in both industry and academia around the world in the race to reap the fruits of genomics and proteomics. Due to the complexities and the sheer number of proteins (easily reaching into thousands) typically involved in proteomics studies, complicated, lengthy, and painstaking physical separations are performed in order to identify and sometime quantify individual proteins in a complex sample. These physical separations create tremendous challenges for sample handling and information tracking, not to mention the days, weeks, and even months it typically takes to fully elucidate the content of a single sample.

While there are only about 35,000 genes in the human genome, there are an estimated 500,000 to 2,000,000 proteins in human proteome that could be studied both for general population and for individuals under treatment or other clinical conditions. A typical sample taken from cells, blood, or urine, for example, usually contains up to several thousand different proteins in vastly different abundances. Over the past decade, the industry has popularized a process that includes multiple stages in order to analyze the many proteins existing in a sample. This process is summarized in Table 1 with the following notable features:

TABLE 1

A Typical Proteomics Process: Time, Cost, and Informatics Needs

| Steps: | Proteomics Process: |
|---|---|
| Sample collection | Isolate proteins from biological samples such as blood, tissue, urine, etc.<br>Instrument cost: minimal; Time: 1-3 hours<br>Mostly liquid phase sample<br>Need to track sample source/preparation conditions |
| Gel separation | Separate proteins spatially through gel electrophoresis to generate up to several thousand protein spots<br>Instrument cost: $150K; Time: 24 hours<br>Liquid into solid phase<br>Need to track protein separation conditions and gel calibration information |
| Imaging and spot cutting | Image, analyze, identify protein spots on the gel with MW/pI calibration, and spot cutting.<br>Instrument cost: $150K; Time: 30 sec/spot<br>Solid phase<br>Track protein spot images, image processing parameters, gel calibration parameters, molecular weights (MW) and pI's, and cutting records |
| Protein digestion | Chemically break down proteins into peptides<br>Instrument cost: $50K; Time: 3 hours<br>Solid to liquid phase<br>Track digestion chemistry & reaction conditions |
| Protein Spotting or Sample preparation | Mix each digested sample with mass spectral matrix, spot on sample targets, and dry (MALDI) or sample preparation for LC/MS(/MS)<br>Instrument cost: $50K; Time: 30 sec/spot<br>Liquid to solid phase<br>Track volumes & concentrations for samples/reagents |
| Mass spectral analysis | Measure peptide(s) in each gel spot directly (MALDI) or via LC/MS(/MS)<br>Instrument: $200K-650K; Time: 1-10 sec/spot on MALDI or 30 min/spot on LC/MS(/MS)<br>Solid phase on MALDI or liquid phase on LC/MS(/MS)<br>Track mass spectrometer operation, analysis, and peak processing parameters |
| Protein database search | Search private/public protein databases to identify proteins based on unique peptides<br>Instrument cost: minimal; Time: 1-60 sec/spot |
| Summary | Instrument cost: $600K-$1M<br>Time/sample: several days minimal | a. It could take up to several days or weeks or even months to complete the analysis of a single sample.
b. The bulky hardware system costs $600K to $1M with significant operating (labor and consumables), maintenance, and lab space cost associated with it.
c. This is an extremely tedious and complex process that includes several different robots and a few different types of instruments to essentially separate one liquid sample into hundreds to thousands of individual solid spots, each of which needs to be analyzed one-at-a-time through another cycle of solid-liquid-solid chemical processing.

d. It is not a small challenge to integrate these pieces/steps together for a rapidly changing industry, and as a result, there is not yet a commercial system that fully integrates and automates all these steps. Consequently, this process is fraught with human as well as machine errors.

e. This process also calls for sample and data tracking from all the steps along the way—not a small challenge even for today's informatics.

f. Even for a fully automated process with a complete sample and data tracking informatics system, it is not clear how these data ought to be managed, navigated, and most importantly, analyzed.

g. At this early stage of proteomics, many researchers are content with qualitative identification of proteins. The holy grail of proteomics is, however, both identification and quantification, which would open doors to exciting applications not only in the area of biomarker identification for the purpose of drug discovery but also for clinical diagnostics, as evidenced by the intense interest generated from a recent publication (Z. F. Pertricoin, III et al., Lancet, Vol. 359, pp. 573-77, (2002)) on using protein profiles from blood samples for ovarian cancer diagnostics. The current process cannot be easily adapted for quantitative analysis due to the protein loss, sample contamination, or lack of gel solubility, although attempts have been made for quantitative proteomics with the use of complex chemical processes such as ICAT (isotope-coded affinity tags); a general approach to quantitation wherein proteins or protein digests from two different sample sources are labeled by a pair of isotope atoms, and subsequently mixed in one mass spectrometry analysis (Gygi, S. P. et al. *Nat. Biotechnol.* 17, 994-999 (1999)).

Isotope-coded affinity tags (ICAT) is a commercialized version of the approach introduced recently by the Applied Biosystems of Foster City, Calif. In this technique, proteins from two different cell pools are labeled with regular reagent (light) and deuterium substituted reagent (heavy), and combined into one mixture. After trypsin digestion, the combined digest mixtures are subjected to the separation by biotin-affinity chromatography to result in a cysteine-containing peptide mixture. This mixture is further separated by reverse phase EPLC and analyzed by data dependent mass spectrometry followed by database search.

This method significantly simplifies a complex peptide mixture into a cysteine-containing peptide mixture and allows simultaneous protein identification by SEQUEST database search and quantitation by the ratio of light peptides to heavy peptides. Similar to LC/MS, ICAT also circumvents insolubility problem, since both techniques digest whole protein mixture into peptide fragments before separation and analysis.

While very powerful, ICAT technique requires a multi-step process for labeling and pre-separation process, resulting in the loss of low abundant proteins with added reagent cost and further reducing the throughput for the already slow proteomic analysis. Since only cysteine-containing peptides are analyzed, the sequence coverage is typically quite low with ICAT. As is the case in typical LC/MS/MS experiment, the protein identification is achieved through the limited number of MS/MS analysis on hopefully signature peptides, resulting in only one and at most a few labeled peptides for ratio quantitation.

Liquid chromatography interfaced with tandem mass spectrometry (LC/MS/MS) has become a method of choice for protein sequencing (Yates Jr. et al., *Anal. Chem.* 67, 1426-1436 (1995)). This method involves a few processes including digestion of proteins, LC separation of peptide mixtures generated from the protein digests, MS/MS analysis of resulted peptides, and database search for protein identification. The key to effectively identify proteins with LC/MS/MS is to produce as many high quality MS/MS spectra as possible to allow for reliable matching during database search. This is achieved by a data-dependent scanning technique in a quadrupole or an ion trap instrument. With this technique, the mass spectrometer checks the intensities and signal to noise ratios of the most abundant ion(s) in a full scan MS spectrum and perform MS/MS experiments when the intensities and signal to noise ratios of the most abundant ions exceed a preset threshold. Usually the three most abundant ions are selected for the product ion scans to maximize the sequence information and minimize the time required, as the selection of more than three ions for MS/MS experiments would possibly result in missing other qualified peptides currently eluting from the LC to the mass spectrometer.

The success of LC/MS/MS for identification of proteins is largely due to its many outstanding analytical characteristics. Firstly, it is a quite robust technique with excellent reproducibility. It has been demonstrated that it is reliable for high throughput LC/MS/MS analysis for protein identification. Secondly, when using nanospray ionization, the technique delivers quality MS/MS spectra of peptides at sub-femtomole levels. Thirdly, the MS/MS spectra carry sequence information of both C-terminal and N-terminal ions. This valuable information can be used not only for identification of proteins, but also for pinpointing what post translational modifications (PTM) have occurred to the protein and at which amino acid locations the PTM took place.

For the total protein digest from en organism, a cell line, or a tissue type, LC/MS/MS alone is not sufficient to produce enough number of good quality MS/MS spectra for the identification of the proteins. Therefore, LC/MS/MS is usually employed to analyze digests of a single protein or a simple mixture of proteins, such as the proteins separated by two dimensional electrophoresis (2DE), adding a minimum of a few days to the total analysis time, to the instrument and equipment cost, and to the complexity of sample handling and the informatics need for sample tracking. While a full MS scan can and typically do contain rich information about the sample, the current LC/MS/MS methodology relies on the MS/MS analysis that can be afforded for only a few ions in the full MS scan. Moreover, electrospray ionization (ESI) used in LC/MS/MS has less tolerance towards salt concentrations from the sample, requiring rigorous sample clean up steps.

Identification of the proteins in an organism, a cell line, and a tissue type is an extremely challenging task, due to the sheer number of proteins in these systems (estimated at thousands or tens of thousands). The development of LC/LC/MS/MS technology (Link, A. J. et al. *Nat. Biotechnol.* 17, 676-682 (1999), Washburn, M. P.; Wolters, D. & Yates, J. R. 3rd. *Nat. Biotechnol.* 19, 242-247 (2001)) is one attempt to meet this challenge by going after one extra dimension of LC separation. This approach begins with the digestion of the whole protein mixture and employs a strong cation exchange (SCX) LC to separate protein digests by a stepped gradient of salt concentrations. This separation usually takes 10-20 steps to turn an extremely complex protein mixture into a relatively simplified mixture. The mixtures eluted from the SCK column are further introduced into a reverse phase LC and subsequently analyzed by mass spectrometry. This method has been demonstrated to identify a large number of proteins from yeast and the microsome of human myeloid leukemia cells.

One of the obvious advantages of this technique is that it avoids insolubility problems in 2DE, as all the proteins are digested into peptide fragments which are usually much more soluble than proteins. As a result, more proteins can be detected and wider dynamic range achieved with LC/LC/MS/MS. Another advantage is that chromatographic resolution increases tremendously through the extensive 2D LC separation so that more high quality MS/MS spectra of peptides can be generated for more complete and reliable protein identification. The third advantage is that this approach is readily automated within the framework of current LC/MS system for potentially high throughput proteomic analysis.

The extensive 2D LC separation in LC/LC/MS/MS, however, could take 1-2 days to complete. In addition, this technique alone is not able to provide quantitative information of the proteins identified and a quantitative scheme such as ICAT would require extra time and effort with sample loss and extra complications. In spite of the extensive 2D LC separation, there are still a significant number of peptide ions not selected for MS/MS experiments due to the time constraint between the MS/MS data acquisition and the continuous LC elution, resulting in low sequence coverage (25% coverage is considered as very good already). While recent development in depositing LC traces onto a solid support for later MS/MS analysis can potentially address the limited MS/MS coverage issue, it would introduce significantly more sample handling and protein loss and further complicate the sample tracking and information management tasks.

Matrix-Assisted Laser Desorption Ionization (MALDI) utilizes a focused laser beam to irradiate the target sample that is co-crystalized with a matrix compound on a conductive sample plate. The ionized molecules are usually detected by a time of flight (TOF) mass spectrometer, due to their shared characteristics as pulsed techniques.

MALDI/TOF is commonly used to detect 2DE separated intact proteins because of its excellent speed, high sensitivity, wide mass range, high resolution, and contaminant-forgivingness. MALDI/TOF with capabilities of delay extraction and reflecting ion optics can achieve impressive mass accuracy at 1-10 ppm and mass resolution with m/$\Delta$m at 10000-15000 for the accurate analysis of peptides. However, the lack of MS/MS capability in MALDI/TOF is one of the major limitations for its use in proteomics applications. Post Source Decay (PSD) in MALDI/TOF does generate sequence-like MS/MS information for peptides, but the operation of PSD often is not as robust as that of a triple quadrupole or an ion trap mass spectrometer. Furthermore, PSD data acquisition is difficult to automate as it can be peptide-dependent.

The newly developed MALDI TOF/TOF system (T. Rejtar et al., J. Proteomr. Res. 1(2) 171-179 (2002)) delivers many attractive features. The system consists of two TOFs and a collision cell, which is similar to the configuration of a tandem quadrupole system. The first TOF is used to select precursor ions that undergo collisional induced dissociation (CID) in the cell to generate fragment ions. Subsequently, the fragment ions are detected by the second TOF. One of the attractive features is that TOF/TOF is able to perform as many data dependent MS/MS experiments as necessary, while a typical LC/MS/MS system selects only a few abundant ions for the experiments. This unique development makes it possible for TOF/TOF to perform industry scale proteomic analysis. The proposed solution is to collect fractions from 2D LC experiments and spot the fractions onto an MALDI plate for MS/MS. As a result, more MS/MS spectra can be acquired for more reliable protein identification by database search as the quality of MS/MS spectra generated by high-energy CID in TOF/TOF is far better than PSD spectra.

The major drawback for this approach is the high cost of the instrument ($750,000), the lengthy 2D separations, the sample handling complexities with LC fractions, the cumbersome sample preparation processes for MALDI, the intrinsic difficulty in quantification with MALDI, and the huge informatics challenges for data and sample tracking. Due to the separation and the sample preparation time required, the analysis of several hundred proteins in one sample would take at least 2 days.

It is well recognized that Fourier-Transform Ion-Cyclotron Resonance (FTICR) MS is a powerful technique that can deliver high sensitivity, high mass resolution, wide mass range, and high mass accuracy. Recently, FTICR/MB coupled with IC showed impressive capabilities for proteomic analysis through Accurate Mass Tags (AMT) (Smith, R. D et al.; *Proteomics*. 2, 513-523, (2002)). AMT is such an accurate m/z value of a peptide that can be used to exclusively identify a protein. It has been demonstrated that, using the AMT approach, a single LC/FTICR-MS analysis can potentially identify more than $10^5$ proteins with mass accuracy of better than 1 ppm. Nonetheless, ATM alone may not be sufficient to pinpoint amino acid residue specific post-translational modifications of peptides. In addition, the instrument is prohibitively expensive at a cost of $750K or more with high maintenance requirements.

Protein arrays and protein chips are emerging technologies (Issaq, H. J. et al *Biochem Biophys Res Commun.* 292(3), 587-592 (2002)) similar in the design concept to the oligo-nucleotide-chip used in gene expression profiling. Protein arrays consist of protein chips which contain chemically (cationic, anionic, hydrophobic, hydrophilic, etc.) or biochemically (antibody, receptor, DNA, etc.) treated surfaces for specific interaction with the proteins of interest. These technologies take advantages of the specificity provided by affinity chemistry and the high sensitivity of MALDI/TOF and offer high throughput detection of proteins. In a typical protein array experiment, a large number of protein samples can be simultaneously applied to an array of chips treated with specific surface chemistries. By washing away undesired chemical and biomolecular background, the proteins of interest are docked on the chips due to affinity capturing and hence "purified". Further analysis of individual chip by MALDI-TOF results in the protein profiles in the samples. These technologies are ideal for the investigation of protein-protein interactions, since proteins can be used as affinity reagents to treat the surface to monitor their interaction with other specific proteins. Another useful application of these technologies is to generate comparative patterns between normal and diseased tissue samples as a potential tool for disease diagnostics.

Due to the complicated surface chemistries involved and the added complications with proteins or other protein-like binding agents such as denaturing, folding, and solubility issues, protein arrays and chips are not expected to have as wide an application as gene chips or gene expression arrays.

Thus, the past 100 years have witnessed tremendous strides made on the MS instrumentation with many different types of instruments designed and built for high throughput, high resolution, and high sensitivity work. The instrumentation has been developed to a stage where single ion detection can be routinely accomplished on most commercial MS systems with unit mass resolution allowing for the observation of ion fragments coming from different isotopes. In stark contrast to the sophistication in hardware, very little has been done to systematically and effectively analyze the massive amount of MS data generated by modern MS instrumentation.

In a typical mass spectrometer, the user is usually required or supplied with a standard material having several fragment ions covering the mass spectral m/z range of interest. Subject to baseline effects, isotope interferences, mass resolution, and resolution dependence on mass, peak positions of a few ion fragments are determined either in terms of centroids or peak maxima through a low order polynomial fit at the peak top. These peak positions are then fit to the known peak positions for these ions through either $1^{st}$ or other higher order polynomial fit to calibrate the mass (m/z) axis.

After the mass axis calibration, a typical mass spectral data trace would then be subjected to peak analysis where peaks (ions) are identified. This peak detection routine is a highly empirical and compounded process where peak shoulders, noise in data trace, baselines due to chemical backgrounds or contamination, isotope peak interferences, etc., are considered.

For the peaks identified, a process called centroiding is typically applied to attempt to calculate the integrated peak areas and peak positions. Due to the many interfering factors outlined above and the intrinsic difficulties in determining peak areas in the presence of other peaks and/or baselines, this is a process plagued by many adjustable parameters that can make an isotope peak appear or disappear with no objective measures of the centroiding quality.

Thus, despite their apparent sophistication current approaches have several pronounced disadvantages. These include:

Lack of Mass Accuracy. The mass calibration currently in use usually does not provide better than 0.1 amu (m/z unit) in mass determination accuracy on a conventional MS system with unit mass resolution (ability to visualize the presence or absence of a significant isotope peak). In order to achieve higher mass accuracy and reduce ambiguity in molecular fingerprinting such as peptide mapping for protein identification, one has to switch to an MS system with higher resolution such as quadrupole TOF (qTOF) or FT ICR MS which come at significantly higher cost.

Large Peak Integration Error. Due to the contribution of mass spectral peak shape, its variability, the isotope peaks, the baseline and other background signals, and the random noise, current peak area integration has large errors (both systematic and random errors) for either strong or weak mass spectral peaks.

Difficulties with Isotope Peaks. Current approach does not have a good way to separate the contributions from various isotopes which usually give out partially overlapped mass spectral peaks on conventional MS systems with unit mass resolution. The empirical approaches used either ignore the contributions from neighboring isotope peaks or over-estimate them, resulting in errors for dominating isotope peaks and large biases for weak isotope peaks or a even complete ignorance of the weaker peaks. When ions of multiple charges are concerned, the situation becomes worse even, due to the now reduced separation in mass unit between neighboring isotope peaks.

Nonlinear Operation. The current approaches use a multi-stage disjointed process with many empirically adjustable parameters during each stage. Systematic errors (biases) are generated at each stage and propagated down to the later stages in an uncontrolled, unpredictable, and nonlinear manner, making it impossible for the algorithms to report meaningful statistics as measures of data processing quality and reliability.

Dominating Systematic Errors. In most of MS applications, ranging from industrial process control and environmental monitoring to protein identification or biomarker discovery, instrument sensitivity or detection limit has always been a focus and great efforts have been made in many instrument systems to minimize measurement error or noise contribution in the signal. Unfortunately, the peak processing approaches currently in use create a source of systematic error even larger than the random noise in the raw data, thus becoming the limiting factor in instrument sensitivity or reliability.

Mathematical and Statistical Inconsistency. The many empirical approaches used currently make the whole mass spectral peak processing inconsistent either mathematically or statistically. The peak processing results can change dramatically on slightly different data without any wander noise or on the same synthetic data with slightly different noise. In order words, the results of the peak processing are not robust and can be unstable depending on the particular experiment or data collection.

Instrument-To-Instrument Variations. It has usually been difficult to directly compare raw mass spectral data from different MS instruments due to variations in the mechanical, electromagnetic, or environmental tolerances. With the current ad hoc peak processing applied on the raw data, it only adds to the difficulty of quantitatively comparing results from different MS instruments. On the other hand, the need for comparing either raw mass spectral data directly or peak processing results from different instruments or different types of instruments has been increasingly heightened for the purpose of impurity detection or protein identification through the searches in established MS libraries.

Thus, there exists a significant gap between where the proteomics research would like to be and where it is at the present.

SUMMARY OF THE INVENTION

It is an object of the invention to provide a mass spectroscopy system and a method for operating a mass spectroscopy system that overcomes the disadvantages described above.

It is another object of the invention to provide a storage media having thereon computer readable program code for causing a mass spectrometry system to perform the method in accordance with the invention.

It is a further object of the invention to provide mass spectroscopy libraries that are richer in information, and more accurate than current stick spectra libraries.

These objects and others are achieved in accordance with the invention by a method for analyzing data from a mass spectrometer comprising obtaining calibrated continuum spectral data by processing raw spectral data; obtaining library spectral data which has been processed to form calibrated library data; and performing a least squares fit between the calibrated continuum spectral data and the calibrated library data to determine concentrations of components in a sample which generated the raw spectral data. The calibrated library data may be obtained by applying a spectral peak shape function to stick spectrum data in a stick spectrum library. The calibration may be applied to the raw spectral data to provide the calibrated continuum spectral data. The calibration may be performed by using filter functions so as to calibrate both the mass axis and to transform an actual peak shape function into a target peak shape function. The calibrated continuum spectral data may be obtained by interpolation through a mass calibration curve. The calibrated library data may be continuous spectral data derived from stick spectrum data in a stick spectrum library.

The least squares fit comprises solving an equation of the form, or a transpose of an equation of the form:

$$r = Kc + e$$

where r is an (n×1) matrix of the calibrated continuum spectral data; c is a (p×1) matrix of regression coefficients which are representative of the concentrations of p components in a sample; K is an (n×p) matrix composed of continuum mass spectral responses for the p components created from either the library of stick spectra or a pre-calculated library of continuum spectra with known peak shape functions, all sampled at n mass points; and e is an (n×1) matrix of a fitting residual with contributions from random noise and any systematic deviations from a linear model. In the transpose of the equation, r' is a (1×n) matrix, c' is a (1×p) matrix, K' is an (p×n) matrix and e' is a (1×n) matrix:

$$r' = c'K' + e'$$

The values in the matrix c may be determined by inverting matrix K through multiple linear regression as:

$$\hat{c} = (K^T K)^{-1} K^T r$$

where superscript T refers to a matrix transpose; and superscript $-1$ represents matrix inversion. In the transpose of the equation, c' are determined by inverting matrix K' through multiple linear regression as:

$$c' = r' K'^T (K' K'^T)^{-1}$$

where superscript T refers to a matrix transpose; and superscript $-1$ represents matrix inversion.

The method may further comprise ranking candidate ions and ion fragments in the sample based on statistical probability of their presence. The ranking may be based on t-statistics as disclosed in Ser. No. 10/689,313.

In accordance with the invention, the library of stick spectra or a pre-calculated library of continuum spectra may be augmented by ions and ion fragments from new compounds not already included in either library.

In the method, the calibrated continuum spectral data has baseline components, and each baseline component is included as an additional column in the matrix K, or as additional rows in its transpose K'. The method may further comprise, for each statistically significant baseline component, subtracting that baseline component from the calibrated continuum spectral data; removing that component from the matrix K or K'; and again performing the matrix operation to determine concentrations of components in a sample that generated the raw spectral data.

The method may further comprise adding additional baseline terms or candidate library components into matrix K or K'; and again performing the matrix operation to determine concentrations of all components in a sample that generated the raw spectral data.

The method may further comprise building a map of ionization efficiency of a mass spectrometer used to obtain the raw data, as a function of mass and concentration; determining the least squares fit to find initial concentration values for the constituents of the sample; and using the map to normalize each column in matrix K or row in K', except for those corresponding to baseline components, to produce corrected data in which both concentration and mass dependence of ionization efficiency is compensated. The method may still further comprise using the corrected data to arrive at an improved estimate of concentration matrix c or c'; and further correcting values in the columns in matrix K or rows in K'.

Successive iterations of the steps of determining and using may be performed until convergence of concentration values is obtained.

The method may further comprise selecting candidate ion fragments from the library; calculating isotope distribution based on chemical composition for each candidate ion fragment; convoluting the isotope distribution with a peak shape function to obtain a calculated isotope pattern for each candidate ion fragment; and determining values in the matrix K or K' in accordance with the isotope patterns. The values also may be determined based on mass dependent peak shape functions.

The method may further comprise determining variance of intensity of peaks in the raw spectral data as a function of mass; and using an inverse of the variance at each mass spectral date point as a weight in a weighted least squares fit calculation. A weight matrix may be formed in which reciprocals of the respective variances are on a diagonal and zeros are everywhere else. The variance may be determined from successive repetitions of raw mass spectral data, or by a filtering or smoothing operation performed on raw continuum mass spectral data.

The method may further comprise multiplying both sides of the equation by the weight matrix; and performing a least squares fit to solve for concentration.

In accordance with the method, the least squares fit may be determined with a matrix having terms representative of a library of different spectra, each of the spectra representing a different ion fragment. The fragments may be representative of proteins or peptides in the sample.

The method may further comprise operating a mass spectrometer to obtain the raw spectral data, and calibrating the mass spectrometer with respect to mass and peak shape function as a function of mass. A calibration standard may be mixed with the sample to facilitate calibration, or the calibration standard may be introduced interchangeably with the sample to facilitate calibration. The calibration produced when calibrating the mass spectrometer may be used to process the library spectral data to form the calibrated library data. The method may further comprise ranking candidate ions and ion fragments in the sample based on statistical probability of their presence. The ranking may be based on t-statistics. At least one of relative concentration and probability of presence in the sample may be reported as library search results. The mass axis may be transformed into a spacing other than linear spacing prior to the calculating steps.

The invention is also directed to a method for creating a mass spectral library comprising obtaining stick spectra from an existing mass spectral library; obtaining chemical composition for each stick corresponding to an ion or ion fragment; calculating the isotope distribution for each ion or ion fragment based on its chemical composition; specifying a target peak shape function; and performing a convolution operation between the isotope distribution and the target peak shape function to obtain continuum library spectra with target peak shape functions. This method may further comprising calibrating a mass spectrometer into exact mass with the same target peak shape function; obtaining raw continuum data from the mass spectrometer; and applying the calibration to raw continuum data to obtain calibrated continuum data. The mass axis may be transformed into spacing other than linear spacing prior to the calculating steps. The peak shape function may be mass dependent.

The invention is also directed to a computer readable medium having thereon a library for causing a computer to perform analysis of data produced by a mass spectrometer, the library being produced by the process of obtaining stick spectra from an existing mass spectral library; obtaining chemical composition for each stick corresponding to an ion or ion fragment; calculating the isotope distribution for each ion or ion fragment based on its chemical composition; specifying a target peak shape function; and performing a convolution operation between the isotope distribution and the target peak shape function to obtain continuum library spectrum with target peak shape functions.

An additional aspect of the invention is, in general, a computer readable medium having thereon computer readable code for use with a mass spectrometer system having a data analysis portion including a computer, the computer readable code being for causing the computer to analyze data by performing a least squares fit on calibrated continuum spectral data derived from raw spectral data of a sample, and calibrated library data derived from library spectral data, so as to determine concentrations of components in a sample which generated the raw spectral data. The computer readable medium preferably further comprises computer readable code for causing the computer to perform at least one the specific methods described above.

Of particular significance, the invention is also directed generally to a mass spectrometer system for analyzing chemical composition, the system including a mass spectrometer portion, and a data analysis system, the data analysis system operating by obtaining calibrated continuum spectral data by processing raw spectral data; obtaining library spectral data which has been processed to form calibrated library data; performing a least squares fit on the calibrated continuum spectral data and the calibrated library data to determine concentrations of components in a sample which generated the raw spectral data; and ranking or scoring each component based on statistical probability. The data analysis portion may be configured to operate in accordance with the specifics of the methods described above. Preferably the mass spectrometer system further comprises a sample preparation portion for preparing samples to be analyzed, and a sample separation portion for performing an initial separation of samples to be analyzed. The separation portion may comprise at least one of an electrophoresis apparatus, a chemical affinity chip, or a chromatograph for separating the sample into various components.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
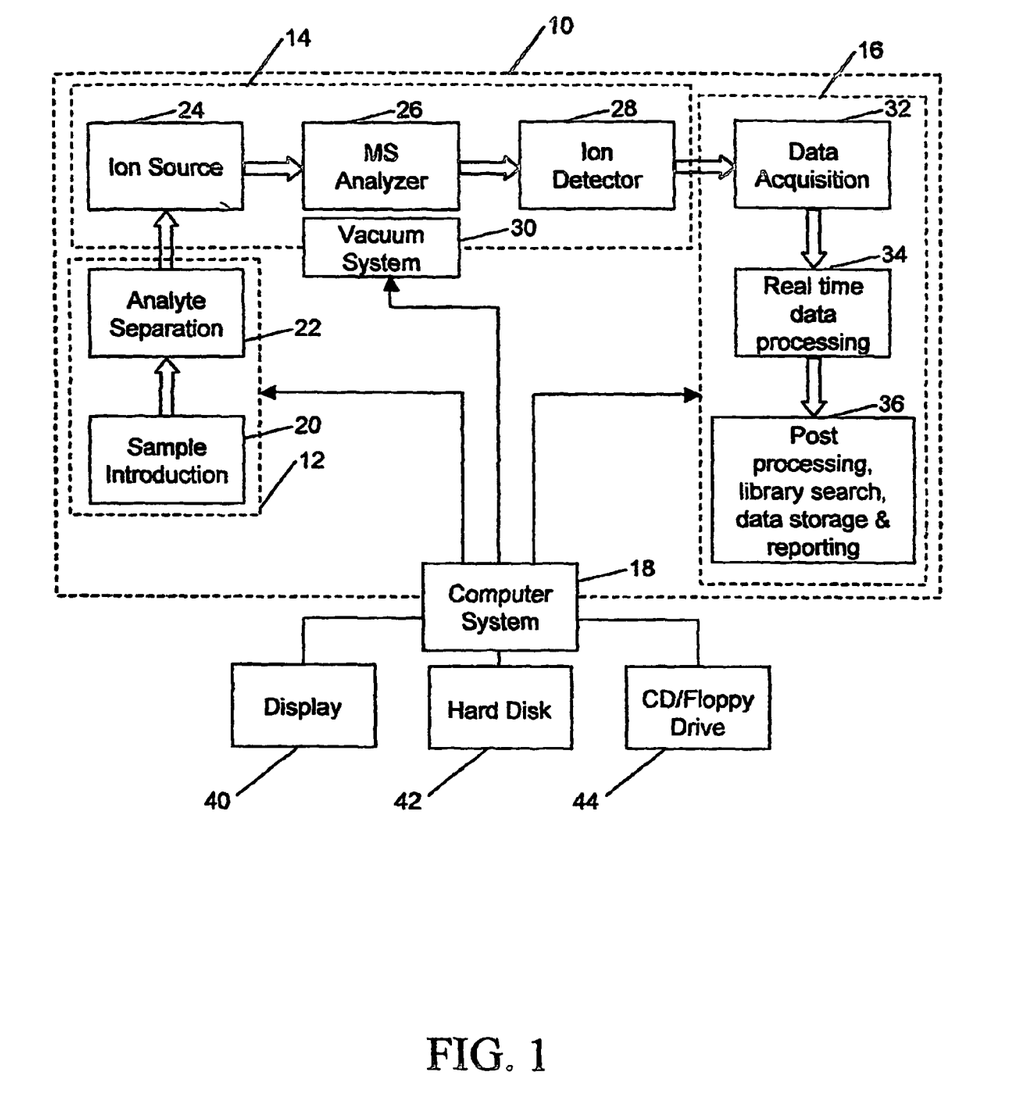
FIG. 1 is a block diagram of a mass spectrometer in accordance with the invention.

Referring to FIG. 1, there is shown a block diagram of an analysis system 10, that may be used to analyze proteins or other molecules, as noted above, incorporating features of the present invention. Although the present invention will be described with reference to the single embodiment shown in the drawings, it should be understood that the present invention can be embodied in many alternate forms of embodiments. In addition, any suitable types of components could be used.

Analysis system 10 has a sample preparation portion 12, a mass spectrometer portion 14, a data analysis system 16, and a computer system 18. The sample preparation portion 12 may include a sample introduction unit 20, of the type that introduces a sample containing proteins or peptides of interest to system 10, such as Finnegan LCQ Deca XP Max, manufactured by Thermo Electron Corporation of Waltham, Mass., USA. The sample preparation portion 12 may also include an analyte separation unit 22, which is used to perform a preliminary separation of analytes, such as the proteins to be analyzed by system 10. Analyte separation unit 22 may be any one of a chromatography column, an electrophoresis separation unit, such as a gel-based separation unit manufactured by Bio-Rad Laboratories, Inc. of Hercules, Calif., and is well known in the art. In general, a voltage is applied to the unit to cause the proteins to be separated as a function of one or more variables, such as migration speed through a capillary tube, isoelectric focusing point (Hannesh, S. M., *Electrophoresis* 21, 1202-1209 (2000), or by mass (one dimensional separation)) or by more than one of these variables such as by isoelectric focusing and by mass (two dimensional separation). An example of the latter is known as SDS-PAGE.

The mass spectrometer portion 14 may be a conventional mass spectrometer and may be any one available, but is preferably one of MALDI-TOF, quadrupole MS, ion trap MS, qTOF, TOF/TOF, or FTICR-MS. If it has a MALDI or electrospray ionization ion source, such ion source may also provide for sample input to the mass spectrometer portion 14. In general, mass spectrometer portion 14 may include an ion source 24, a mass analyzer 26 for separating ions generated by ion source 24 by mass to charge ratio, an ion detector portion 28 for detecting the ions from mass analyzer 26, and a vacuum system 30 for maintaining a sufficient vacuum for mass spectrometer portion 14 to operate efficiently. If mass spectrometer portion 14 is an ion mobility spectrometer, generally no vacuum system is needed.

The data analysis system 16 includes a data acquisition portion 32, which may include one or a series of analog to digital converters (not shown) for converting signals from ion detector portion 28 into digital data. This digital data is provided to a real time data processing portion 34, which process the digital data through operations such as summing and/or averaging. A post processing portion 36 may be used to do additional processing of the data from real time data processing portion 34, including library searches, data storage and data reporting.

Computer system 18 provides control of sample-preparation portion 12, mass spectrometer portion 14, and data analysis system 16, in the manner described below. Computer system 18 may have a conventional computer monitor 40 to allow for the entry of data on appropriate screen displays, and for the display of the results of the analyses performed. Computer system 18 may be based on any appropriate personal computer, operating for example with a Windows® or UNIX® operating system, or any other appropriate operating system. Computer system 18 will typically have a hard drive 42, on which the operating system and the program for performing the data analysis described below is stored. A drive 44 for accepting a CD or floppy disk is used to load the program in accordance with the invention on to computer system 18. The program for controlling sample preparation portion 12 and mass spectrometer portion 14 will typically be downloaded as firmware for these portions of system 10. Data analysis system 16 may be a program written to implement the processing steps discussed below, in any of several programming languages such as C++, JAVA or Visual Basic.

A first order instrument generates a vector of data for each sample and represents the higher level of sophistication in analytical instrumentation and analysis. An example of first order instrument directly related to proteomics is a mass spectrometer capable of operating in full MS scan mode with direct sample infusion for liquid or gas samples and MALDI sample introduction for solid samples.

With the extra information available from a first order instrument, first order analysis is intrinsically capable of quantifying multiple proteins coexisting in a single sample, overcoming a key difficulty in zeroth order analysis there only a single data point is collected for each sample. In first order proteomics analysis, all coexisting and interfering proteins in a new sample need to be known and their mass spectral responses available. Assuming there are p proteins with their MS responses measured at n different mass points, the response of a sample containing all these proteins can be expressed in matrix notation as $$r = Kc + e \quad \text{Equation 1}$$

where K (n×p) is the pure protein mass spectral response matrix, r (n×1) is the response vector of the sample under analysis, c (p×1) contains the concentrations of the p proteins to be estimated, and e (n×1) is the fitting residual with contributions from random noise and any systematic deviations from the linear model assumed. The concentrations can be easily estimated by inverting matrix K through Multiple Linear Regression as $$\hat{c} = (K^T K)^{-1} K^T r \quad \text{Equation 2}$$

where the superscript T refers to matrix transpose and the superscript −1 represents matrix inversion. While the above equations can be applied to mass spectral data after centroiding (called stick spectra by those skilled in the art), it is preferred that continuum mass spectral response without centroiding be used in order to reduce errors in masses and peak areas introduced by centroiding. Furthermore, it is preferred to have fully calibrated continuum mass spectral data in this invention to further improve mass alignment and spectral peak shape consistency, as described in co-pending application Ser. No. 10/689,313, a brief summary of which is set forth below.

Producing Fully Calibrated Continuum Mass Spectral Data

A calibration relationship of the form:

$$m = f(m_0) \quad \text{(Equation A)}$$

can be established through a least-squares polynomial fit between the centroids measured and the centroids calculated using all clearly identifiable isotope clusters available in the mass spectral standard across the mass range.

In addition to this simple mass calibration, additional full spectral calibration filters are calculated to serve two purposes simultaneously: the calibration of mass spectral peak shapes and mass spectral peak locations. Since the mass axis may have been pre-calibrated, the mass calibration part of the filter function is reduced in this case to achieve a further refinement on mass calibration, i.e., to account for any residual mass errors after the polynomial fit given by Equation A.

This total calibration process applies easily to quadrupole-type MS including ion traps where mass spectral peak width (Full Width at Half Maximum or FWHM) is generally roughly consistent within the operating mass range. For other types of mass spectrometer systems such as magnetic sectors, TOF, or FTMS, the mass spectral peak shape is expected to vary with mass in a relationship dictated by the operating principle and/or the particular instrument design. While the same mass-dependent calibration procedure is still applicable, one may prefer to perform the total calibration in a transformed data space consistent with a given relationship between the peak width/location and mass.

In the case of TOF, it is known that mass spectral peak width (FWHM) $\Delta m$ is related to the mass (m) in the following relationship:

$$\Delta m = a\sqrt{m}$$

where a is a known calibration coefficient. In other words, the peak width measured across the mass range would increase with the square root of the mass. With a square root transformation to convert the mass axis into a new function as follows:

$$m' = \sqrt{m}$$

where the peak width (FWHM) as measured in the transformed mass axis is given by $$\frac{\Delta m}{2\sqrt{m}} = \frac{a}{2}$$

which will remain unchanged throughout the spectral range.

For an FT MS instrument, on the other hand, the peak width (FWHM) $\Delta m$ will be directly proportional to the mass m, and therefore a logarithm transformation will be needed:

$$m' = \ln(m)$$

where the peak width (FWHM) as measured in the transformed log-space is given by $$\ln\left(\frac{m + \Delta m}{m}\right) = \ln\left(1 + \frac{\Delta m}{m}\right) \approx \frac{\Delta m}{m}$$

which will be fixed independent of the mass. Typically in FTMS, $\Delta m/m$ can be managed on the order of $10^{-5}$, i.e., $10^5$ in terms of the resolving power $m/\Delta m$.

For a magnetic sector instrument, depending on the specific design, the spectral peak width and the mass sampling interval usually follow a known mathematical relationship with mass, which may lend itself a particular form of transformation through which the expected mass spectral peak width would become independent of mass, much like the way the square root and logarithm transformation do for the TOF and FTMS.

When the expected mass spectral peak width becomes independent of the mass, due either to the appropriate transformation such as logarithmic transformation on FTMS and square root transformation on TOF-MS or the intrinsic nature of a particular instrument such as a well designed and properly tuned quadrupole or ion trap MS, huge savings in computational time will be achieved with a single calibration filter applicable to the full mass spectral range. This would also simplify the requirement on the mass spectral calibration standard: a single mass spectral peak would be required for the calibration with additional peak(s) (if present) serving as check or confirmation only, paving the way for complete mass spectral calibration of each and every MS based on an internal standard added to each sample to be measured. There are usually two steps in achieving total mass spectral calibration.

The first steps is to derive actual mass spectral peak shape functions and the second step is to convert the derive actual peak shape functions into a specified target peak shape functions centered at correct mass locations. An internal or external standard with its measured raw mass spectral continuum $y_0$ is related to the isotope distribution y of a standard ion or ion fragment by $$y_0 = y \otimes p$$

where p is the actual peak shape function to be calculated. This actual peak shape function is then converted to a specified target peak shape function t (a Gaussian of certain FWHM, for example) through one or more calibration filters given by $$t = p \otimes f$$

The calibration filters calculated above can be arranged into the following banded diagonal filter matrix:

$$F = \begin{bmatrix} f_1 & & & & \\ & \ldots & & & \\ & & f_i & & \\ & & & \ldots & \\ & & & & f_n \end{bmatrix}$$

in which each short column vector on the diagonal, $f_i$, is taken from the convolution filter calculated above for the corresponding center mass. The elements in $f_i$ is taken from the elements of the convolution filter in reverse order, i.e., $$f_i = \begin{bmatrix} f_{i,m} \\ f_{i,m-1} \\ \vdots \\ f_{i,1} \end{bmatrix}$$

As an example, this calibration matrix will have a dimension of 8,000 by 8,000 for a quadrupole MS with mass coverage up to 1,000 amu at ⅛ amu data spacing. Due to its sparse nature, however, typical storage requirement would only be around 40 by 8,000 with an effective filter length of 40 elements covering a 5-amu mass range.

Returning to the present invention, the current approaches to protein identification include extensive sample separation through either 2D gel or 2D LC followed by a spot-by-spot or fraction-by-fraction MS analysis of hopefully pure proteins. If quantification is required, techniques such as ICAT will need to be added to the process. A typical MALDI-TOF spectrum thus measured shows only a few peaks sparsely populating the vast mass spectral range with very limited information content, pointing to vastly under-utilized analytical capabilities and representing one of the key opportunities to be explored by this invention. Instead of physical separation, advanced matrix operations are applied to a single mass spectrum collected from either intact or digested protein mixtures with little or no separation. At least a 10-fold improvement in proteomics throughput is possible with both qualitative and quantitative analysis simultaneously achieved in a single unified step. The essential steps of this new approach include:

a. Take mass spectral measurement of a complex mixture of proteins or their peptides with little or no separation. The mass spectrum thus measured is densely populated and denoted as a long column vector, r, in equation 1. This mass spectrum may come from any one of the available MS instruments, e.g., MALDI-TOF, quadrupole MS, ion trap MS, or FTICR-MS. It should be noted that with the high analytical power (resolution, mass accuracy, and mass range) of FTICR-MS, many more proteins or peptides can be packed into a MS spectrum. The theoretical upper limit on the number of proteins or peptides that can be analyzed simultaneously is given roughly by the mass range divided by the resolution width, i.e., the number of resolution elements. For an ion trap MS covering the mass range of 400 to 2,000 amu with 0.5 amu FWHM, the number of resolution elements would approach approximately 1,600, implying that potentially 1,600 proteins or their peptides could be analyzed in a single MS collection. With the wide mass range of TOF and FTICR-MS instruments and the accompanying higher mass resolution, many more compounds can be analyzed simultaneously.

b. Construct a matrix K in equation 1 with columns representing the mass spectral responses of all known proteins (either actual measured or computed based on gene sequences through in-silico approaches). It should be stressed here that the mass spectral responses refer to continuum mass spectral data as acquired without peak area integration or centroiding, i.e., the profile mode data. Typically, the matrix K could be dimensioned as 16,000 by 500,000 for a protein database composed of 500,000 proteins with peptides measured in the mass range of 400 to 2000 amu with 0.1 amu data interval. The intrinsic dimensionality or pseudo rank of matrix K is however only 1,600 in this example, implying that only 1,600 linearly independent components could be determined at a time. One may choose to compress the original matrix K through operations such as Principal Component Analysis (Beebe, K. R.; Kowalski, B. R. Anal. Chem. 59, 1007A(1987)) and replace the matrix K with loading vectors of matching intrinsic dimensions. Alternatively, one may include only one analyte or protein at a time into matrix K and solve a small (2×2) (or 3×3, depending on the number of baseline components to be included) problem 500,000 times to select the most significant analyte or protein first before adding a second analyte or protein into the matrix K for the next round of search for more and more significant analytes or proteins. Furthermore, one may choose to manage the actual dimensionality by working with a limited mass spectral (mass to charge ratio or m/z) range covering as few as one or more isotope patterns at a time. An added advantage of working with limited m/z range is that the time-skew existing in time-dependent events such as LC/MS, GC/MS, or CE/MS would become less of a problem, and the required correction or compensation may be avoided all together.

i. If the mass list comes from the actual measured protein database, it should already contain information related to multiple-charged ions, post-translational modifications such as phosphoxylation and other important proteomic information. The isotope distribution for each of the mass peak, however, may have been lost due to centroiding and therefore need to be reconstructed from the chemical formulae mathematically, for example, in the manner described in U.S. application Ser. No. 10/689,313.

ii. If the protein peptide peaks are calculated through in-silico approaches, the isotope distribution, multiple charges, and post-translation modifications need to be mathematically constructed.

c. Numerically convert the stick spectra in the columns of K into profile mode data via convolution with either theoretical or measured instrument or calibrated line profiles, typically of Gaussian shape with either weak (ion trap MS) or strong (TOF or FT-MS) dependence on the actual masses, for example, in the manner described in U.S. application Ser. No. 10/689,313.

d. Perform the matrix operation in Equation 2 to mathematically separate out the contributions from each protein in the database to the mixture mass spectrum r. The concentration vector c thus obtained for one sample can be compared to that from another sample for relative quantitative analysis or differential proteomics analysis without isotope tags as in ICAT.

e. Instead of ad hoc scoring, statistically rigorous confidence level such as t-statistics or p-values can be established for each protein concentration in the vector c to test the presence or absence of a particular protein in the sample and achieve qualitative analysis for the purpose of protein identification.

f. If there are new proteins or modifications that have not been included in the protein database (matrix K), the large fitting residual e will serve as a warning sign and point to their approximate mass locations.

Compared to other alternatives currently in use or being proposed, this approach represents a new and ultra fast approach to whole proteome analysis with significant advantages:

a. Due to its sound mathematical and statistical basis, this approach eliminates the many ad hoc and nonlinear operations in current mass spectral processing and protein/peptide library searching, resulting in a theoretically elegant process for proteomics.

b. The analysis can be accomplished based on a single conventional MS (e.g., MALDI TOF) measurement of the protein mixtures with little or no-separation.

c. Both qualitative and quantitative information are obtained without extra chemistry steps involved.

d. The process is deceptively simple and extremely fast with sample throughput potential of whole proteome analysis in one second, compared to the state-of-the-art at one gel spot per second for conventional 2DE MALDI TOF analysis where one sample may result in several thousands of gel spots taking several days.

e. The approach is designed to handle protein/peptide mixtures whereas many conventional approaches would break down with 2 or more proteins in a mixture.

f. This approach bypasses the complicated, error-prone, and ad hoc mass spectral peak picking processes altogether with noise filtering and spectral smoothing automatically built-in.

g. By working with all known and significant isotopes from protein databases or actual measured protein mass spectral profiles without centroiding errors, complete data integrity is preserved with all isotope patterns automatically included in the search.

Thus, this approach provides extremely high throughput, mathematical elegance, much lower instrument cost, and simplicity.

Figure 2:
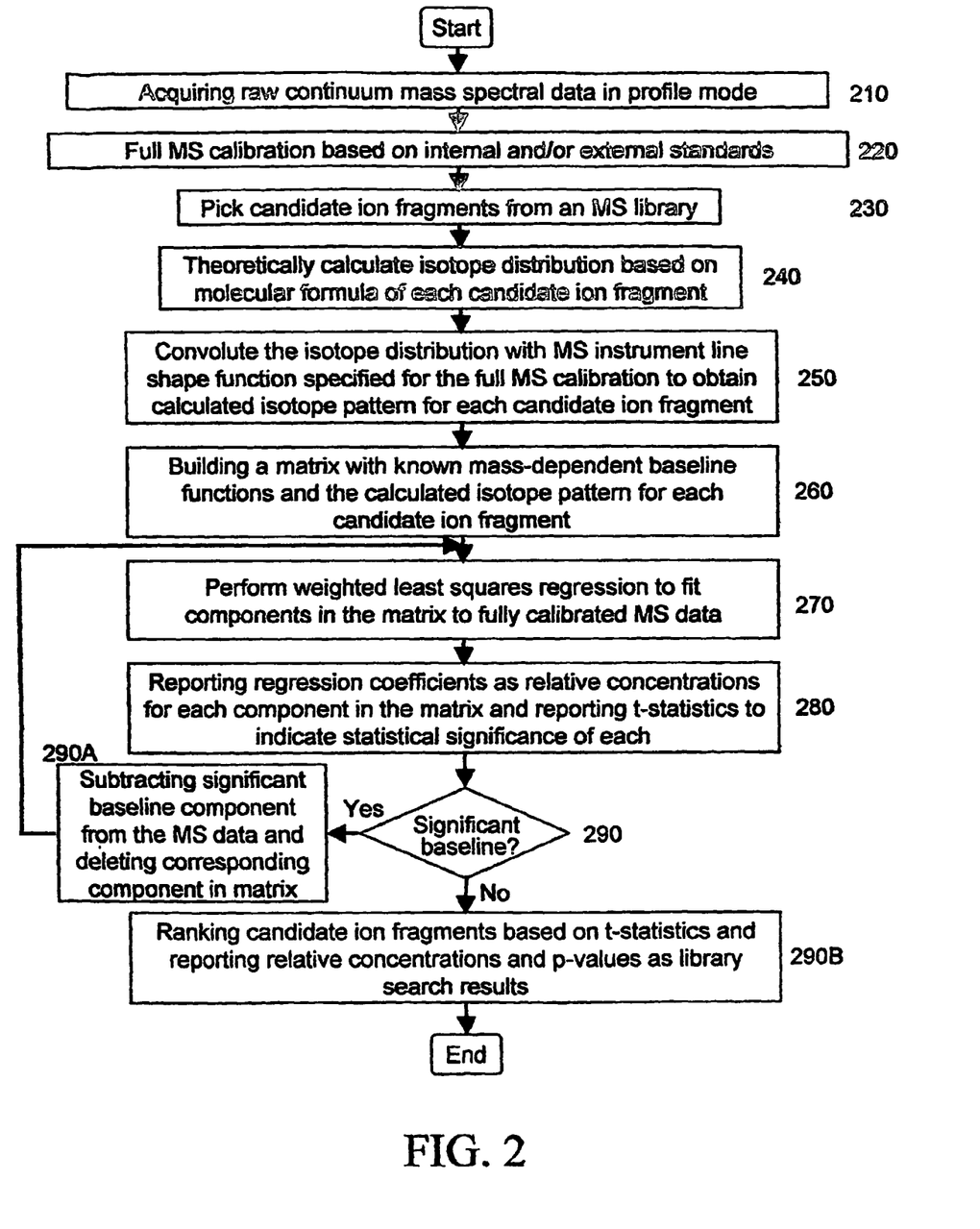
FIG. 2 is flow chart of the steps in the analysis used by the system of FIG. 1.

Referring to FIG. 2, at step 210, raw continuum mass spectral data is obtained for a sample containing, for example, a complex mixture of proteins. While, as mentioned above, most commercial techniques utilize stick spectral data, it will be recognized that the use of the entire raw spectrum means that data is not lost due to a premature gross simplification of the features of the data. However, this raw spectrum has characteristics relating to instrument peak shape function, instrument resolution, and baseline variations due to spurious ions and neutral particles that may reach the detector. Further, there may be a mass dependence with respect to all of these potential factors. For example, there is an exponential decay of baseline displacement as a function of increasing mass to charge ration in a MALDI system, principally due to ions of the matrix material, some of which arrive at the detector, despite every attempt to reduce their presence.

At step 220, the raw data acquired in step 210 is subjected to a full calibration of the mass spectrometer based on internal and/or external standards so as to standardize the raw continuum data. This assures that the peaks are lined up at the proper mass to charge ratios, and that the shape of the peaks is properly matched mathematically. This is preferably accomplished by the procedure set forth in my co-pending U.S. patent application Ser. No. 10/689,313 entitled Methods For Operating Mass Spectrometry (MS) Instrument Systems filed on Oct. 20, 2003, the entire contents of which are incorporated herein by reference. This calibrated data, still in the form of a continuum, must be compared to the stick spectra in a selected library to identify the proteins that contributed to the raw data.

At step 230, candidate ion fragments are selected from the mass spectrum library. It is appreciated that each analyte may have multiple ion fragments scattered in a given mass spectral range, and this invention can be carried out in one or multiple selected mass ranges targeting specific ions or fragments or across the whole mass range targeting all possible ions or fragments.

At step 240, the react mass locations for ions and fragments in the library are recalculated based on elemental composition (the chemical formula for each ion or fragment). This includes isotope distributions, which are taken into account in the manner described in Ser. No. 10/689,313.

At step 250 the isotope distribution is convoluted with the target instrument peak shape function specified in the full mass spectral calibration of step 220 to obtain a calculated isotope pattern (mass spectral continuum) for each candidate ion fragment. As used herein, for this purpose, and for other purposes throughout this document, the term convolution may refer to matrix operations, or point by point operation in Fourier transform space, or any other type of convolution, filtering, or correlation, either of a traditional type, or not.

At step 260, a matrix is generated with known mass-dependent baseline functions and the calculated isotope pattern for the ion fragments of each candidate analyte such as a protein in the given mass range. Examples of mass-dependent baseline functions include a flat line and several lower order terms such as linear or quadratic terms. The combination of these lower order terms can adequately compensate for an exponentially decaying baseline within a small mass spectral range, and help arrive at the computationally efficient linear solutions, though one may choose to incorporate the nonlinear terms explicitly and seek a nonlinear solution instead.

At step 270, a classical least squares regression (or weighted least squares regression with all weights equal to one) is performed to fit components of the matrix generated in step 260 to the fully calibrated raw spectrum data of step 220. In general, we have:

$$r = Kc + e \qquad \text{Equation 3}$$

where r is a (n×1) matrix of the fully calibrated continuum spectrum of step 220, c is a (p×1) matrix of the regression coefficients, which are representative of the concentrations of the p components in the sample, and K is an (n×p) matrix composed of continuum mass spectral responses for the p components created from either the library of stick spectra or a pre-calculated library of continuum spectra with known instrument shape functions. Note in this notation, each baseline component is also considered an analyte with the corresponding baseline term as the continuum mass spectral response.

As noted above, an equivalent equation of the same general form may be solved, specifically, through the equation $\hat{c} = (K^T K)^{-1} K^T r$ or $c' = r' K'^T (K' K'^T)^{-1}$ where the superscript T refers to matrix transpose and the superscript $-1$ represents matrix inversion. These two method of solving the equation are equivalent.

At step 280, the regression coefficients (values in c) are reported out as the relative concentrations for each component in the matrix r (in the sample). Statistics (typically t-statistics or p-values) to indicate the statistical significance of each concentration coefficient any also be reported in the manner described in Ser. No. 10/689,313.

At step 290 a statistical test based on either t-statistic or p-value is performed to determine whether any or all of the baseline components included in the matrix K are significant. In this regard, the baseline may be treated in the analysis as if it another compound found in the sample (in the data produced in step 220). If any baseline component is significant, then branching to step 290A occurs, and this baseline component is subtracted from data produced at step 220, and corresponding columns are deleted from the matrix K before operations on the data continue by returning to step 270, and repeating steps 270, 280 and 290. This process of first estimating the contribution of the possible baseline components as part of an overall fit followed by the removal of significant baseline components serves the purpose of unbiased removal of baselines without introducing extra components into Equation 1. Typically as more components (columns in this case) are added to the matrix R, its conditioning would get worse, resulting in less precise estimation of concentration matrix c. By removing all significant baselines in the process, the conditioning of the K matrix is improved leading to more precise concentration estimates for c. This iterative removal of baseline components here is optional, but generally leads to improved accuracy.

When all significant baseline components have been removed, at step 290B, candidate ion fragments are ranked based on t-statistics or p-values. Further, with respect to certain candidates with abundance close to baseline, a probability of presence or absence, rather than a precise concentration, is computed. The concentrations and probabilities are reported out by computer 18 (FIG. 1) by being displayed on the monitor 40 and/or by printing on a printer (not shown) associated with computer 18.

The process described above includes a fairly comprehensive series of steps, for purposes of illustration, and to be complete. However, there are many ways in which the process may be varied, including leaving out certain steps, or performing certain steps before hand or "off-line". For example, it is possible to conduct a calibration once, and to use that calibration for some period of time with the same instrument. In addition, one may less desirably omit step 220 in FIG. 2 and work with assumed peak shape functions using only a conventional multi-point mass axis calibration with rudimentary level of mass accuracy. Furthermore, the operations performed on the spectra in the library need only be performed once, and the resulting calibrated library spectra with a given target peak shape function may be used for all instruments or even instrument types that are fully calibrated to the same target peak shape function. In this regard, a calibrated library produced in accordance with the invention is a very valuable commodity that can be sold separately, because it has high intrinsic value to different users of different mass spectrometer systems that are standardized on to the same peak shape functions.

Conversely certain steps may be combined or performed at the same times as other steps. For example, if one or more known compounds are added as internal standards to the sample mixture, they will generate known spectra, which may be used to perform an on-the-fly full mass spectral calibration in the manner described in Ser. No. 10/689,313.

Even though all of the steps described above have been performed, it is still possible that results will be obtained that are not truly indicative of the quantity of particular constituents of the sample. For example, such errors may be due to difficulties associated with ionization efficiency; that is some ions from the same constituent are less efficiently ionized than others, so that they are under-represented in the output. While generally less of a problem with respect to GC/MS techniques, where errors may be in the order of three percent to ten percent, in the case of MALDI or electrospray ionization, for certain species, this error may be on the order of ten percent to thirty percent or even more. In some applications, where it is only necessary to determine whether, for example, a protein is present or not, or to determine whether its presence is clearly above a particular level, this may not be an issue. However, for many applications, including diagnosis for the presence of disease, more precise determination of analyte concentration is necessary.

One approach to determine analyte concentration more precisely is to use an iterative calculation. A standard that produces ionization fragments with mass to charge ratios and concentrations over a calibration range of interest is run. Based on the results of this run, a map is built of ionization efficiency as a function of mass to charge ratio and concentration. A classical least squares fit (or weighted least squares fit with all weights equal to one) for the data is determined to arrive at initial concentration values for the constituents of the sample. The map is used to normalize each column in matrix K (except for the baseline components) so that both concentration and mass to charge ratio dependence of ionization efficiency is compensated for. A classical least squares fit is performed on the corrected data to arrive at an improved estimate of concentration matrix c, which will allow for an even better correction of columns in matrix K. Successive iterations are performed until convergence of the concentration values is obtained.

Another approach that may be used to correct for variations in ionization efficiency is to use a weighted least squares fit. This approach may be used when multiple replicates of the same sample are run, which is generally the case for systems wherein chromatography is used for an initial separation of analytes, and essentially the same sample is run through the mass spectrometer repetitively within a tiny time window. Other good example of this repetitive mass spectral scans include MALDI-TOF where tens or hundreds of individual laser shots are used on same sample to acquire the same many individual mass spectral scans, continuous flow sample introduction through infusion in electron spray ionization (ESI), chip-based ESI sample introduction such as Nanomate™ from Advion Biosciences of Ithaca, N.Y., USA (G. Schultz et al., *Anal. Chem.*, 72, 4058(2000)).

The variance of the output (intensity of the peaks) may be determined as a function of mass to charge ratio. The inverse of the variance at each m/z data point is used as a weight in the weighted least squares fit calculation. The weight matrix W may take the reciprocals of the respective variances on the diagonal and zeros elsewhere. Both sides of Equation 1 are multiplied by this matrix to yield:

Wr=WKc        Equation 3

A least classical least squares fit identical in form to Equation 2 is then applied, wherein (Wr)=r' and WK=K' to solve for the concentrations c in:

r'=c K'        Equation 4

If a constituent of the sample provides a signal that is highly variable, it will have a relatively small weight, and therefore will not be as influential in the least squares fit calculation. If the variation in signal for a particular constituent is very small, it will have a relatively large weight in the calculation, and therefore will be more influential in the least squares fit calculation.

Yet another approach is to obtain the appropriate weights in the weighted least squares fit is to use the variance spectrum obtained as part of the full mass spectral calibration in the manner described in Ser. No. 10/689,313.

Other computations and statistical analysis including t-statistics and p-values for weighted multiple linear regression can also be performed in the manner described in U.S. application Ser. No. 10/689,313.

It will be understood that on some occasions, not all of the ions or ion fragments in a sample will be found in the library. New molecules will be discovered. If this is the case, there will be extra component for which no determination of concentration can be made, at least initially, that will reduce the fitting residual e in equation 1 down to measurement noise level. It is necessary to have a portion of the sample available for use with a tandem mass spectrometer to determine the structure and the chemical composition of the unknown species. Once the identity and chemical composition of the unknown species has been determined either the library of stick spectra or a pre-calculated library of continuum spectra can be augmented by ions and ion fragments from new compounds not already included in the relevant library for future search.

It is noted that the terms "mass" and "mass to charge ratio" are used somewhat interchangeably in connection with information or output as defined by the mass to charge ratio axis of a mass spectrometer. This is a common practice in the scientific literature and in scientific discussions, and no ambiguity will occur, when the terms are read in context, by one skilled in the art.

The methods of analysis of the present invention can be realized in hardware, software, or a combination of hardware and software. Any kind of computer system—or other apparatus adapted for carrying out the methods and/or functions described herein—is suitable. A typical combination of hardware and software could be a general purpose computer system with a computer program that, when being loaded and executed, controls the computer system, which in turn control an analysis system, such that the system carries out the methods described herein. The present invention can also be embedded in a computer program product, which comprises all the features enabling the implementation of the methods described herein, and which—when loaded in a computer system (which in turn control an analysis system), is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Thus, it should be understood that the foregoing description is only illustrative of the invention. Various alternatives and modifications can be devised by those skilled in the art without departing from the invention. Other beneficial results can be realized by applying the disclosed invention in a different manner or modifying the invention in ways known to those familiar with the art. Thus, it should be understood that the embodiments has been provided as an example and not as a limitation. Accordingly, the present invention is intended to embrace all alternatives, modifications and variances which fall within the scope of the appended claims.

What is claimed is:

1. A method for analyzing data from a mass spectrometer comprising:
    obtaining calibrated mass spectral data by processing raw spectral data representative of at least one ion with its isotopes;
    obtaining library spectral data which has been processed to form calibrated library data;
    performing a regression analysis between said calibrated mass spectral data and the calibrated library data; and
    reporting at least one regression coefficient obtained by said regression analysis, said regression coefficient being representative of concentration of a component in a sample which generated said raw spectral data.

2. The method of claim 1, wherein said calibrated library data is obtained by applying a spectral peak shape function to stick spectrum data in a stick spectrum library.

3. The method of claim 1, wherein a calibration is applied to said raw spectral data to provide said calibrated mass spectral data.

4. The method of claim 3, wherein said calibration is performed by using filter functions so as to calibrate both the mass axis and to transform an actual peak shape function into a target peak shape function.

5. The method of claim 3, wherein said calibrated mass spectral data is obtained by interpolation through a mass calibration curve.

6. The method of claim 1, wherein said calibrated library data is mass spectral data derived from stick spectrum data in a stick spectrum library.

7. The method of claim 1, wherein said regression analysis comprises solving an equation of the form, or a transpose of an equation of the form:

$$r = Kc + e$$

where r is an (n×1) matrix of the calibrated mass spectral data;
c is a (p×1) matrix of regression coefficients which are representative of the concentrations of p components in a sample;
K is an (n×p) matrix composed of mass spectral responses for the p components created from either the library of stick spectra or a pre-calculated library of spectra with known peak shape functions, all sampled at n mass points; and
e is an (n×1) matrix of a fining residual with contributions from random noise and any systematic deviations from a linear model.

8. The method of claim 7, wherein, in said transpose of said equation, r' is a (1×n) matrix, c' is a (1×p) matrix, K' is an (p×n) matrix and e' is a (1×n) matrix.

9. The method of claim 7, wherein the values in the matrix c are determined by inverting matrix K through multiple linear regression as:

$$\hat{c} = (K^T K)^{-1} K^T r$$

where superscript T refers to a matrix transpose; and superscript −1 represents matrix inversion.

10. The method of claim 9, wherein, in said transpose of said equation, C' are determined by inverting matrix K' through multiple linear regression as:

$$c' = r' K'^T (K' K'^T)^{-1}$$

where superscript T refers to a matrix transpose; and superscript −1 represents matrix inversion.

11. The method of claim 7, further comprising ranking at least one of candidate ions and ion fragments in said sample based on statistical probability of their presence.

12. The method of claim 11, wherein said ranking is based on t-statistics.

13. The method of claim 7, wherein either the library of stick spectra or a pre-calculated library of mass spectra are augmented by at least one of data representative of ions and ion fragments from new compounds not already included in either library.

14. The method of claim 7, wherein the calibrated mass spectral data has baseline components, and each baseline component is included as additional columns in said matrix K, or as additional rows in a transpose of K.

15. The method of claim 14, further comprising, for each statistically significant baseline component:
subtracting that baseline component from the calibrated mass spectral data;
removing that component from the, matrix K; and
again performing the matrix operation to determine concentrations of components in a sample which generated said raw spectral data.

16. The method of claim 7, further comprising:
adding additional baseline terms or candidate library components into matrix K; and
again performing the matrix operation to determine concentrations of all components in a sample which generated said raw spectral data.

17. The method of claim 7, further comprising:
building a map of ionization efficiency of a mass spectrometer used to obtain the raw data, as a function of mass and concentration;
determining said least squares fit to find initial concentration values for the constituents of the sample; and
using the map to normalize each column in matrix K, except for those corresponding to baseline components, to produce corrected data in which both concentration and mass dependence of ionization efficiency is compensated.

18. The method of claim 17, further comprising:
using the corrected data to arrive at an improved estimate of concentration matrix c; and
further correcting values in the columns in matrix K.

19. The method of claim 17, further comprising: performing successive iterations of the steps of determining and using, until convergence of concentration values is obtained.

20. The method of claim 7, further comprising:
selecting candidate ions or ion fragments from the library;
calculating isotope distribution based on chemical composition for each candidate ion or ion fragment; and
convoluting the isotope distribution with a peak shape function to obtain a calculated isotope pattern for each candidate ion or ion fragment;
determining values in said matrix K in accordance with said isotope patterns.

21. The method of claim 20, wherein said values are also determined based on mass dependent peak shape functions.

22. The method of claim 7, further comprising:
determining variance of intensity of peaks in the raw spectral data as a function of mass; and
using an inverse of the variance at each mass spectral data point as a weight in a weighted least squares fit calculation.

23. The method of claim 22, wherein a weight matrix is formed in which reciprocals of the respective variances are on a diagonal and zeros are everywhere else.

24. The method of claim 22, wherein the variance is determined from successive repetitions of raw mass spectral data.

25. The method of claim 22, wherein the variance is determined from a filtering or smoothing operation performed on continuum mass spectral data.

26. The method of claim 7, further comprising:
multiplying both sides of said equation by said weight matrix; and
performing a least squares fit to solve for concentration.

27. The method of claim 1, wherein said regression analysis comprises determining a least squares fit with a matrix having terms representative of a library of different spectra, each of said spectra representing a different ion or ion fragment.

28. The method of claim 27, wherein said ion or ion fragments are representative of proteins or peptides in said sample.

29. A computer readable medium having thereon computer readable code for use with a mass spectrometer system having a data analysis portion including a computer, said computer readable code being for causing said computer to perform the method of any one of claims 1-27.

30. The method of claim 1, further comprising operating a mass spectrometer to obtain said raw spectral data.

31. The method of claim 30, further comprising calibrating said mass spectrometer with respect to mass and peak shape function as a function of mass.

32. The method of claim 31, wherein a calibration standard is mixed with the sample to facilitate calibration.

33. The method of claim 31, wherein a calibration standard is introduced interchangeably with the sample to facilitate calibration.

34. The method of claim 31, wherein a calibration produced when calibrating said mass spectrometer is used to process said library spectral data to form said calibrated library data.

35. The method of claim 1, further comprising:
ranking at least one of candidate ions and ion fragments in said sample based on statistical probability of their presence.

36. The method of claim 35, wherein said ranking is based on t-statistics.

37. The method of claim 35, further comprising reporting at least one of relative concentration and probability of presence in said sample as library search results.

38. The method of claim 1, wherein a mass axis is transformed into a spacing other than linear spacing prior to said calculating steps.

39. A mass spectrometer system for analyzing chemical composition, said system including a mass spectrometer portion, and a data analysis system, said data analysis system operating by performing the method of claim 1.

40. The mass spectrometer system of claim 39, further comprising a sample preparation portion for preparing samples to be analyzed.

41. The mass spectrometer system of claim 39, further comprising a sample separation portion for performing an initial separation of samples to be analyzed.

42. The mass spectrometer system of claim 41, wherein said separation portion comprises an electrophoresis apparatus for separating said sample into various components.

43. The mass spectrometer system of claim 41, wherein said separation portion comprises a chemical affinity chip for separating said sample into various components.

44. The mass spectrometer system of claim 41, wherein said separation portion comprises a chromatographic column for separating said sample into various components.

45. A method for creating a mass spectral data library comprising:
obtaining stick spectra from an existing mass spectral data library;
obtaining chemical composition for each stick corresponding to an ion or ion fragment;
calculating the isotope distribution for each ion or ion fragment based on its chemical composition;
specifying a target peak shape function;
performing a convolution operation between the isotope distribution and the target peak shape function to obtain a mass spectral data library with target peak shape functions; and
storing the data library for later use.

46. The method of claim 45, further comprising:
calibrating a mass spectrometer into exact mass with the same said target peak shape function;
obtaining raw mass spectral data from said mass spectrometer; and
applying said calibration to raw mass spectral data to obtain calibrated mass spectral data.

47. The method of claim 46, wherein said peak shape function is mass dependent.

48. The method of claim 45, wherein a mass axis is transformed into spacing other than linear spacing prior to said calculating steps.

49. The method of claim 48, wherein said peak shape function is transformed so as to be mass independent.

50. The method of claim 45, further comprising utilizing the library in a regression analysis to carry out at least one of qualitative and quantitative analysis.

51. A computer readable medium having thereon a data library for causing a computer to perform analysis of data produced by a mass spectrometer, said library being produced by the process of:
obtaining stick spectra from an existing mass spectral data library;
obtaining chemical composition for each stick corresponding to an ion or ion fragment;
calculating the isotope distribution for each ion or ion fragment based on its chemical composition;
specifying a target peak shape function;
performing a convolution operation between the isotope distribution and the target peak shape function to obtain a mass spectral data library with target peak shape functions; and
providing the computer readable medium for later use of the data library.

52. The computer readable medium of claim 51, the process further comprising utilizing the library in a regression analysis to carry out at least one of qualitative and quantitative analysis.

* * * * *